Patented Jan. 21, 1941

2,229,511

UNITED STATES PATENT OFFICE 2,229,511

BASIC ZINC NAPHTHENATE AND A PROCESS OF MAKING IT

Kenneth E. Long, South Euclid, Ohio, assignor to The Harshaw Chemical Company, Elyria, Ohio, a corporation of Ohio No Drawing. Original application April 14, 1934, Serial No. 720,658. Divided and this application March 16, 1939, Serial No. 262,109

6 Claims. (Cl. 260—429)

This invention relates to a partially basic zinc naphthenate and process of making same and is a division of my copending application Serial No. 720,658, filed April 14, 1934, now Patent No. 2,157,767.

my invention, organic salts of dried metals commercially available as driers in the paint, varnish and printing ink trade, etc. were slightly acid, or, at best, neutral. Such driers, when dissolved in paint solvents or thinners have a tendency to thicken or jell. The presence of organic acid tends to prevent this but slows the drying.

High metal content is universally recognized as desirable in a drier but prior to my invention no drier compositions of suitable metal content and properties of drying effect, solubility and compatibility with paints, etc. were available.

I have discovered that a zinc naphthenate drier composition of suitable metal content, possessing desirable solubility and giving highly desirable results in practice is obtained by reacting suitable proportions of a suitable zinc compound, desirably oxide or hydroxide, and naphthenic acid. A suitable proportion is one such that there is present substantially more than one normal combining equivalent of zinc for each combining equivalent of acid but not more than about 1.68 combining equivalents of zinc for each equivalent of acid.

The reaction of proper amounts of zinc compound and naphthenic acid may be effected by simply heating the reactants together or the reaction may be carried out in a high boiling, water entraining liquid such as mineral oil, kerosene, naphtha, etc.

Example I

About 20 parts of zinc oxide and about 86 parts of naphthenic acid of acid value about 250 are mixed and heated slowly. Reaction begins at about 70° C. and is completed between 130° and 140° C., heating being carried to the point, slightly higher if necessary, to insure removal of all water formed. Reaction is complete in about 2 hours. The product is a basic zinc naphthenate containing about 16 per cent zinc. By suitable proportioning of materials, an even higher zinc content which cuts in paint solvents to form a clear solution may be obtained. Naphthenic acids of acid No. 150 to 350 can be used, the percentage of metal in the resulting composition varying accordingly.

Example II

As another example: About 25 parts of zinc oxide are made into a slurry with 20 parts of petroleum naphtha, and mixed with about 82 parts of naphthenic acid (acid value about 250). The mixture is heated slowly, and reaction begins at about 70° C. and is completed at about 130 to 140° C. Further heating to about 150° C. is however advisable, to make sure that the reaction is complete, and water is driven off. The resulting zinc naphthenate contains about 20 per cent zinc, and the product can be cut, while still sufficiently hot, with solvents, if desired, to form a conveniently-handled liquid product containing 16 per cent zinc.

Having thus described my invention, what I claim is:

1. A zinc salt product of naphthenic acid containing combined zinc to the extent of more than one combining equivalent weight of zinc oxide to each combining equivalent weight of acid but not substantially more than 1.68 combining equivalents of zinc for each combining equivalent of acid.

2. A process of making metal drier salts, which comprises heating more than a normal combining equivalent of a zinc compound from the group consisting of oxides and hydroxides with an organic monobasic carboxylic acid forming an oil-soluble salt, and a high boiling water entraining liquid.

3. A zinc salt product of naphthenic acid containing combined zinc to the extent of more than one combining equivalent weight of zinc oxide to each combining equivalent weight of acid but not substantially more than 1.25 combining equivalents of zinc for each combining equivalent of acid.

4. A zinc salt product of naphthenic acid containing a greater proportion of zinc than neutral zinc naphthenate ($Zn(OOCR)_2$) but a lesser proportion of zinc than contained in fully basic zinc naphthenate ($Zn(OH)OOCR$), RCOO representing in both occurrences a naphthenic acid radical, the proportion of zinc being not greater than that resulting from combining 25 parts by weight of zinc oxide with 82 parts by weight of naphthenic acid of acid value 250.

5. A zinc salt product of naphthenic acid containing a greater proportion of zinc than neutral zinc naphthenate ($Zn(OOCR)_2$) but a lesser proportion of zinc than contained in fully basic zinc naphthenate ($Zn(OH)OOCR$), RCOO representing in both occurrences a naphthenic acid radical, the proportion of zinc being not greater than that resulting from combining 20 parts by weight of zinc oxide with 86 parts by weight of naphthenic acid of acid value 250.

6. A process comprising heating a quantity of naphthenic acid with a zinc compound of the group consisting of the oxide and the hydroxide, the reaction being carried out in a temperature range between approximately 70° C. and 140° C. in a high boiling, water entraining liquid, the proportion of zinc compound employed being more than required to produce neutral zinc naphthenate $(Zn(OOCR)_2)$ and less than required to produce fully basic zinc naphthenate $(Zn(OH)OOCR)$, RCOO representing in both occurrences a naphthenic acid radical, the proportion of zinc compound employed being such as to provide an amount of zinc for each combining equivalent weight of naphthenic acid not greater than in the product resulting from combining 25 parts by weight of zinc oxide with 82 parts by weight of naphthenic acid of acid value 250.

KENNETH E. LONG.

CERTIFICATE OF CORRECTION.

January 21, 1941.

Patent No. 2,229,511.

KENNETH E. LONG.

It is hereby certified that error appears in the printed specification of the above numbered patent requiring correction as follows: Page 1, first column, line 6, for the word "dried" read --drier--; and that the said Letters Patent should be read with this correction therein that the same may conform to the record of the case in the Patent Office.

Signed and sealed this 25th day of March, A. D. 1941.

Henry Van Arsdale,
Acting Commissioner of Patents.

(Seal)